No. 645,713. Patented Mar. 20, 1900.
E. F. CREAGER.
RETAINER FOR BALL BEARINGS.
(Application filed May 1, 1899.)
(No Model.)
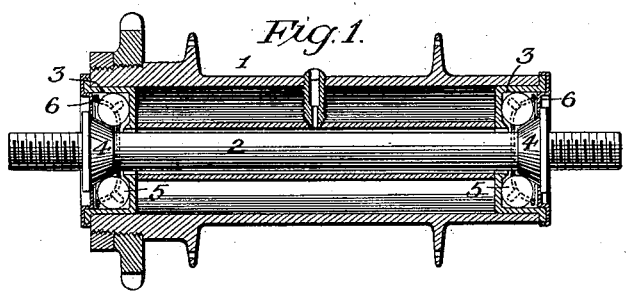
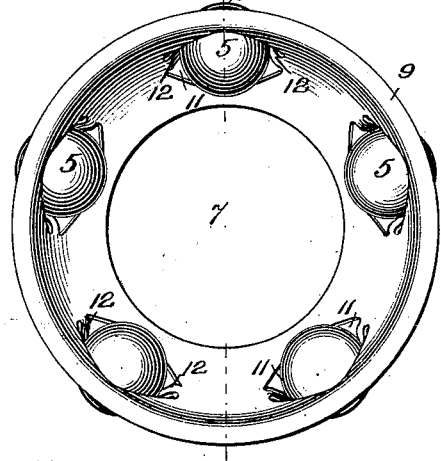
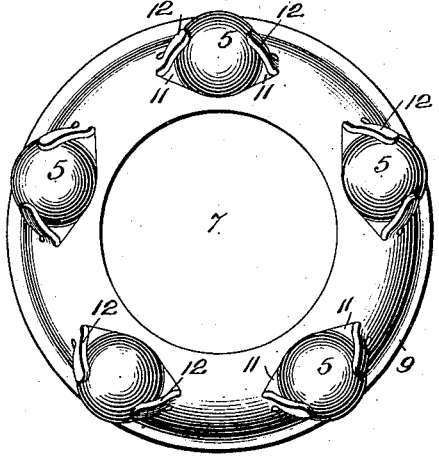
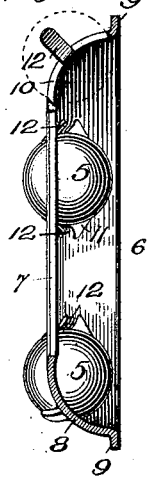
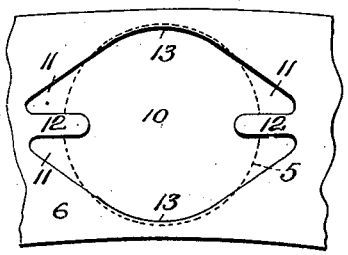
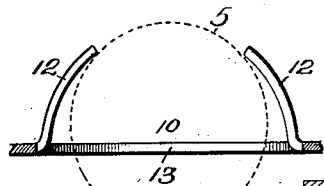
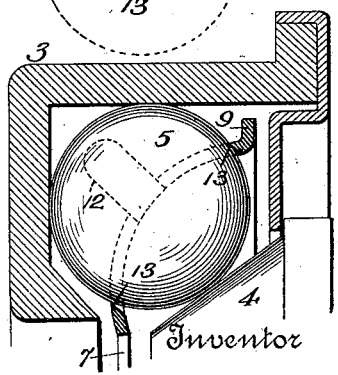
Witnesses
Jos. C. Stack.
Rufus H. Thayer
Inventor
E. F. Creager
by
his Attorney

UNITED STATES PATENT OFFICE.

EDWIN FRANCIS CREAGER, OF LANCASTER, PENNSYLVANIA.

RETAINER FOR BALL-BEARINGS.

SPECIFICATION forming part of Letters Patent No. 645,713, dated March 20, 1900.

Application filed May 1, 1899. Serial No. 715,224. (No model.)

*To all whom it may concern:*

Be it known that I, EDWIN FRANCIS CREAGER, a citizen of the United States, residing at Lancaster, in the county of Lancaster and State of Pennsylvania, have invented certain new and useful Improvements in Retainers for Ball-Bearings; and I do hereby declare the following to be a full, clear, and exact description of the invention, such as will enable others skilled in the art to which it appertains to make and use the same.

My invention relates to improvements in ball-bearings, and particularly to ball retainers and separators to be used with ball-bearings. Its object is to provide a device by which the balls may be all held in a ball chamber, shell, or casing without danger of displacement when the cone or other parts are removed and by which the balls may be separated from each other and so arranged with reference to the bearings as to reduce the friction to a minimum.

It consists, essentially, of an oblate spheroid of metal or similar material having perforations with tangential extensions to receive the balls and tangs to retain them and having an extension lip or flange by which the retainer is strengthened.

In the accompanying drawings, Figure 1 is a longitudinal section of an approved form of hub with my retainer and separator applied. Fig. 2 is, with reference to the succeeding views, a bottom plan view of the retainer with a set of balls in place. Fig. 3 is a top plan view with the balls in place. Fig. 4 is a central section on the line $x\ x$ of Fig. 2. Fig. 5 is an enlarged plan, partially extended, to illustrate one of the ball-holding perforations. Fig. 6 is a sectional detail of Fig. 5. Fig. 7 is an enlarged sectional detail showing the retainer in position.

In the drawings, 1 designates a hub; 2, a shaft; 3, a cup or ball-chamber; 4, a cone; 5, antifriction-balls, and 6 the retainer as a whole.

7 is an axial perforation; 8, the curved wall of the retainer; 9, an extension lip or flange on the rim; 10, ball-receiving perforations; 11, tangential extensions of the perforations 10; 12, tangs, and 13 contact-surfaces.

The retainer 6 is preferably formed of metal cast, spun, or stamped in any approved manner. The retainer is in form a segment of a hollow oblate spheroid. This shape enables the retainer to fit any chamber within the ordinary range and brings the ball into the best relations with the walls of the chamber and the surface of the cone.

The retainer 6 may be readily formed by stamping. The first blow forms the cup-shaped ring or spheroid, with no injurious distortion of the metal, and may also punch the central or axial perforation for the passage of a shaft or axle, though this may be done separately, if desired. The next operation forms the receptacles or perforations 10 and the tangs 12 and may also finish and position the tangs, thus completing the retainer. I prefer, however, to finish the retainer in separate or additional operations. The formation and construction of the ring are such that nowhere in making it is the metal subject to undue strain or injurious distortion, and the tangs may easily be arranged with reference to the lamination of the material, thereby increasing their strength and elasticity.

In the example of the illustration I have shown two tangs both on the same side. I place the base of a tang outside the contact-line of the perforation—that is, outside the circle formed by continuing the periphery of the perforation from the points of contact with a ball.

The perforations are of smaller diameter than the balls and are substantially circular in outline, but have at opposite quarters tangential extensions 11, so that in action the major part of the balls will lie beyond the perforations and so that the contact will be limited to the least space possible, just sufficient, in fact, to form retaining-walls.

I have indicated in Fig. 1 and more plainly in Fig. 7 the clearance possible with my retainer in place, which practically always remains constant. Its form—that of an oblate spheroid—renders it applicable to any bearing-chamber and permits a maximum clearance and obviously allows a wide range of adjustment of bearings and the use of any form of cone.

I have shown the rim bent around into the plane of rotation of the retainer, thus forming an extension lip or flange which lies beyond the body of the retainer—that is, beyond the curved or spherical ring and parallel to the plane of rotation thereof. The extension lip or flange permits the use of additional metal to strengthen the retainer, which would otherwise be somewhat weakened by the formation of the perforations 10. In any form of retainer involving a perforated ring the extension lip or flange bent as I have shown it enables me to secure all the necessary clearance and yet add additional metal and give greater stiffness and strength to the retainer. It also enables me to trim or cut away superfluous metal by a punching-die instead of by shears. It is especially advantageous in the special form of retainer shown in this application, fitting into the advantages of economy of space and strength secured by the oblate-spheroid shape.

The distinguishing features of my retainer are the form—substantially that of a segment of a hollow oblate spheroid—the tangential extensions of the perforations, and the extension lip or flange. The simplest corresponding plane figure is a frustum of a cone. I have discovered that a retainer in the form of an oblate spheroid has many advantages. It will fit all styles of bearing, even those having the familiar upturned lip at the bottom. A given size of retainer will fit several sizes of bearings. In fact, a regulation retainer fits all the usual sizes. The highest number of balls may be carried by my retainer, leaving sufficient metal between the balls to retain its strength. In that form a perforation may be made sufficiently large to easily admit a ball beneath the tangs and yet prevent the ball from falling outward, so that two tangs only or tangs on one side only need be used, and with that form I secure a firm strong base behind each tang, which makes the tang not simply yielding or flexible, but also elastic—an essential where two tangs are used, as in my form.

I have used the word "retainer" throughout the specification as a convenient term to designate a device having functions of both a retainer and a separator—that is, a cage for holding all the balls in place when removed from the hub and preventing contact of the balls in action.

Having fully described my invention, what I claim is—

1. A ball-bearing comprising a separator and retainer having perforations to receive balls, the perforations being substantially circular, with tangential extensions at opposite quarters, and tangs guarding and retaining the balls.

2. A ball-bearing comprising a retainer in the form of a perforated ring, having an extension lip or flange lying beyond the body of the retainer and parallel to the plane of rotation thereof, substantially as described.

3. A ball-bearing comprising a retainer substantially in the form of a segment of a hollow, perforated, oblate spheroid, having an extension lip or flange bent into the plane of rotation, substantially as described.

In testimony whereof I affix my signature in presence of two witnesses.

EDWIN FRANCIS CREAGER.

Witnesses:
JAS. F. ERISMAN,
CHAS. H. FLICK.